US010247015B2

(12) United States Patent
Kush et al.

(10) Patent No.: US 10,247,015 B2
(45) Date of Patent: Apr. 2, 2019

(54) COOLED BLISK WITH DUAL WALL BLADES FOR GAS TURBINE ENGINE

(71) Applicants: Rolls-Royce Corporation, Indianapolis, IN (US); Rolls-Royce North American Technologies Inc., Indianapolis, IN (US)

(72) Inventors: Matthew T. Kush, Martinsville, IN (US); Douglas D. Dierksmeier, Franklin, IN (US)

(73) Assignees: Rolls-Royce Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 262 days.

(21) Appl. No.: 15/405,476

(22) Filed: Jan. 13, 2017

(65) Prior Publication Data
US 2018/0230831 A1    Aug. 16, 2018

(51) Int. Cl.
*F01D 5/18* (2006.01)
*F01D 5/34* (2006.01)

(52) U.S. Cl.
CPC ............. *F01D 5/34* (2013.01); *F01D 5/186* (2013.01); *F05D 2220/32* (2013.01); *F05D 2230/211* (2013.01); *F05D 2230/31* (2013.01); *F05D 2230/53* (2013.01); *F05D 2260/202* (2013.01)

(58) Field of Classification Search
CPC ........ F01D 5/34; F01D 5/186; F05D 2230/53; F05D 2230/31; F05D 2230/211; F05D 2260/202; F05D 2220/32; Y02T 50/676

USPC ......................................................... 416/96 R
See application file for complete search history.

(56) References Cited

U.S. PATENT DOCUMENTS

| 5,165,852 | A  | * | 11/1992 | Lee ......................... F01D 5/187 |
|           |    |   |         | 416/95                                  |
| 5,244,345 | A  |   | 9/1993  | Curtis                                  |
| 5,738,493 | A  | * | 4/1998  | Lee ......................... F01D 5/187 |
|           |    |   |         | 415/115                                 |
| 5,797,726 | A  | * | 8/1998  | Lee ......................... F01D 5/187 |
|           |    |   |         | 416/96 R                                |
| 5,876,182 | A  |   | 3/1999  | Schulte                                 |
| 6,022,190 | A  |   | 2/2000  | Schillinger                             |
| 6,213,714 | B1 |   | 4/2001  | Rhodes                                  |
| 6,837,687 | B2 | * | 1/2005  | Lee ......................... F01D 5/18  |
|           |    |   |         | 416/224                                 |
| 6,923,616 | B2 | * | 8/2005  | McRae, Jr. .............. F01D 5/187    |
|           |    |   |         | 415/115                                 |

(Continued)

FOREIGN PATENT DOCUMENTS

DE    103 61 882 B4    7/2005
WO    WO 2011/054342 A1    5/2011

*Primary Examiner* — Hai H Huynh
(74) *Attorney, Agent, or Firm* — Brinks Gilson & Lione

(57) ABSTRACT

A gas turbine engine and a blisk are disclosed, including methods of making the same. The blisk may include a disk, spars of airfoils, platforms, and shanks of airfoils integrally formed as a unit. Such blisk features may be integrally formed by a casting process or additive manufacturing. The blisk includes cooled airfoils, such that the spar is hollow, and a cover panel is bonded to an outer surface of standoffs to define passages between the cover panel and the spar. Cooling air is fed to the hollow spar through a cooling feed channel defined in the disk or shank portion.

20 Claims, 8 Drawing Sheets

(56) References Cited

U.S. PATENT DOCUMENTS

| | | | |
|---|---|---|---|
| 7,189,063 B2 * | 3/2007 | Honkomp | F01D 5/081 |
| | | | 416/193 A |
| 7,322,396 B2 * | 1/2008 | Govern | B23K 9/0026 |
| | | | 164/122.1 |
| 7,431,564 B2 | 10/2008 | Newman | |
| 8,556,576 B2 | 10/2013 | Wilson, Jr. et al. | |
| 8,992,168 B2 | 3/2015 | Norris et al. | |
| 9,249,669 B2 * | 2/2016 | Garcia-Crespo | F01D 5/147 |
| 9,528,377 B2 * | 12/2016 | Fedor | F01D 5/081 |
| 2006/0093484 A1 | 5/2006 | Liang | |
| 2007/0071608 A1 | 3/2007 | Trewiler et al. | |
| 2010/0284817 A1 | 11/2010 | Bamberg et al. | |
| 2010/0322767 A1 | 12/2010 | Nadvit et al. | |
| 2011/0255991 A1 | 10/2011 | Borufka et al. | |
| 2013/0039760 A1 | 2/2013 | Burt et al. | |
| 2016/0130957 A1 | 5/2016 | Freeman et al. | |
| 2016/0222806 A1 | 8/2016 | Jennings | |
| 2016/0222822 A1 | 8/2016 | Jennings | |
| 2016/0258320 A1 | 9/2016 | Thomas et al. | |
| 2018/0135424 A1 * | 5/2018 | Barker | F01D 5/186 |
| 2018/0135426 A1 * | 5/2018 | Barker | F01D 5/187 |
| 2018/0230832 A1 * | 8/2018 | Dierksmeier | F01D 5/188 |

\* cited by examiner

COOLED BLISK WITH DUAL WALL BLADES FOR GAS TURBINE ENGINE

TECHNICAL FIELD

The present disclosure relates generally to gas turbine engines, and more specifically to bladed disks or blisks used in sections of gas turbine engines.

BACKGROUND

At least some known turbine engines include an air intake portion, a compressor portion, a combustion portion, a turbine portion, and an exhaust portion. Such known turbine engines produce thrust and/or extract energy from a fluid flow by first compressing the intake air within the compressor portion. The compressor portion may include a series of bladed disks to form a multi-stage, axial compressor. Fuel is added to the compressed air, and the mixture is combusted in the combustion portion. The resulting hot, high-pressure gas is then expanded through the turbine portion to extract energy therefrom. The turbine portion may include a series of bladed disk assemblies (or blisks) to form a multi-stage turbine. Turbine blisks include a series of turbine blades arranged circumferentially about a rotor or disk. Blades may be secured to the rotor by the root of the blade. Current turbine blisks have been expensive to assemble due to the number of components and tight tolerances. In addition, turbine blisks without suitable heat management strategies may have shorter lifecycles and limit the efficiency and power of the turbine engine. Thus, a need exists for an improved turbine blisks, and methods for manufacturing the same.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Disclosed herein are examples of blisks that may be used in different sections, such as, compressor and/or turbine sections, of gas turbine engines for any industry, such as, for example, to power aircraft, watercraft, power generators, and the like. The blades of the blisks may be configured to receive cooling air. Cooled blades, for example, cooled turbine blades, advantageously may extend the life of the blades beyond single service life cycles. Cooled blades may allow the turbine engine to run hotter and more powerful as the blades are configured to withstand hotter gas temperature environments. Cooled blades may allow the turbine engine to run more efficiently because less air from the compressor may be required for cooling and, instead, be used for work such as combustion. The blade configurations may include a single wall or dual wall spar configuration, having a spar and a panel cover sheet bonded to standoffs of the spar. The blisks may be fully casted as an integral, single unit component, for example, using a casting process or by additive manufacturing. Alternatively, a bladed annular structure, which may be casted or made from additive manufacturing as an integral, single unit component, may be metallurgically bonded to a rotor disk to form the blisk. The integrated blisk structures may be less expensive to manufacture, when considering the attachment costs and weight costs of attaching the blades to the disk individually with a dovetail or fir tree attachment configuration.

Figure 1:
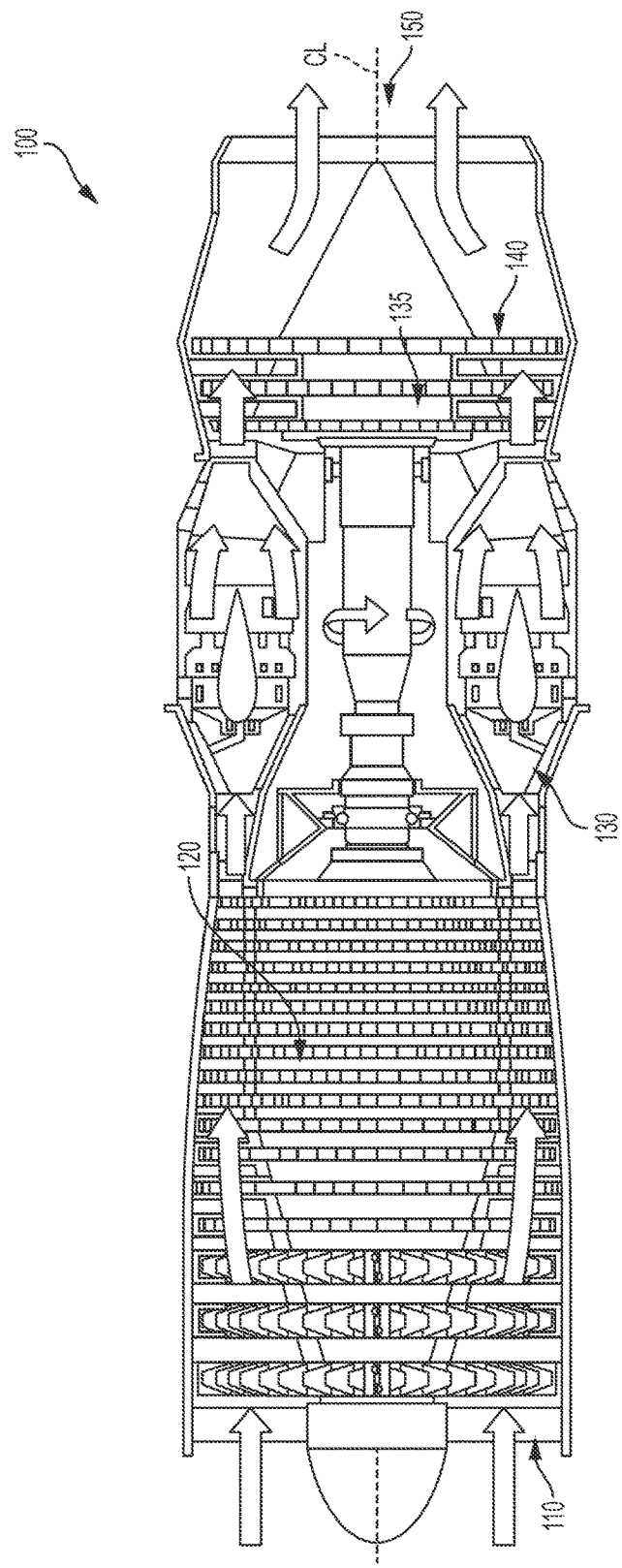
FIG. 1 depicts an example of a gas turbine engine including an example of a blisk.

FIG. 1 is a cross-sectional view of one example of a turbine engine 100. The engine 100 may include one or more of the following: an air intake portion 110, a compressor portion 120, a combustion portion 130, a turbine portion 135, and an exhaust portion 150 disposed along a longitudinal axis CL. The engine 100 may be used in any suitable application, such as, for example, to produce thrust in aircraft applications, to drive a propeller in aquatic applications, or to drive a generator in energy applications. In use, air received from the intake portion 110 may be compressed within the compressor portion 120. The compressor portion 120 includes a series of bladed disks to form a multi-stage, axial compressor. The compressed air may be then mixed with fuel and the mixture may be burned in combustion portion 130. The combustion portion 130 may include any suitable fuel injection and combustion mechanisms. The hot, high-pressure gas may be then passed through the turbine portion 135 to extract energy from the gas, which in turn drives the compressor portion 120 while discharging thrust out the exhaust portion 150.

As shown, the turbine portion 135 may include a series of turbine blisks (or bladed disk assemblies) 140. In this manner, the blisks 140 may form a multi-stage turbine. In use, the gas temperatures within the turbine portion 135 may reach temperatures at or above 2000° F., 2400° F., or higher. Moreover, certain components within the turbine portion 135, such as the flow path portion of the blisks 140 may reach temperatures of between 1600 and 1900° F., and higher, due to the heat transferred from the hot gas. To accommodate these temperatures, in some embodiments, the blisks 140 may include blades that include internal cooling flow passages, as will be described.

Figure 3:
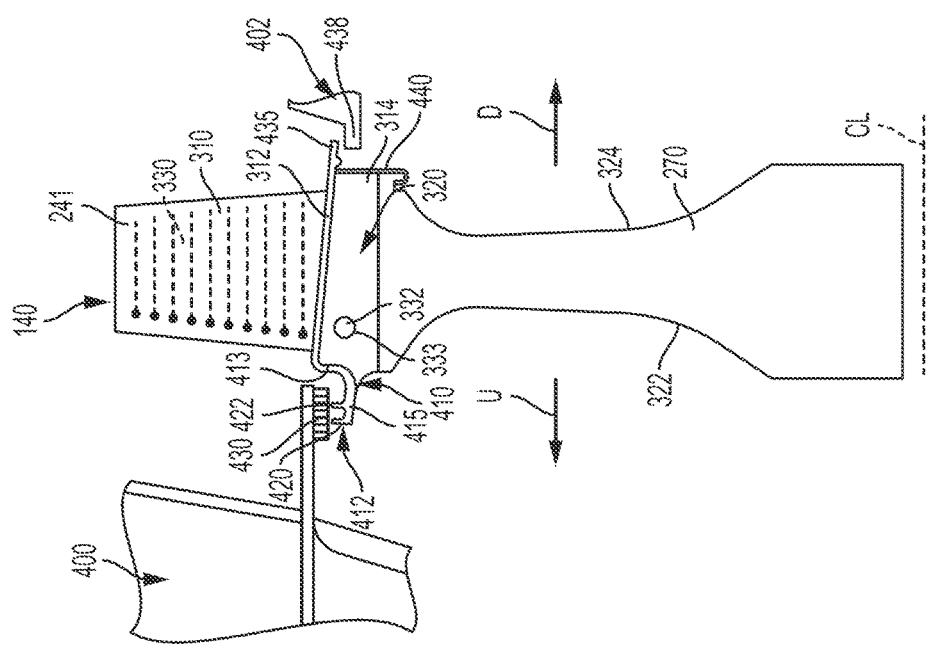
FIG. 3 is sectional view of the blisk taken along lines 3-3 in FIG. 2.
Figure 2:
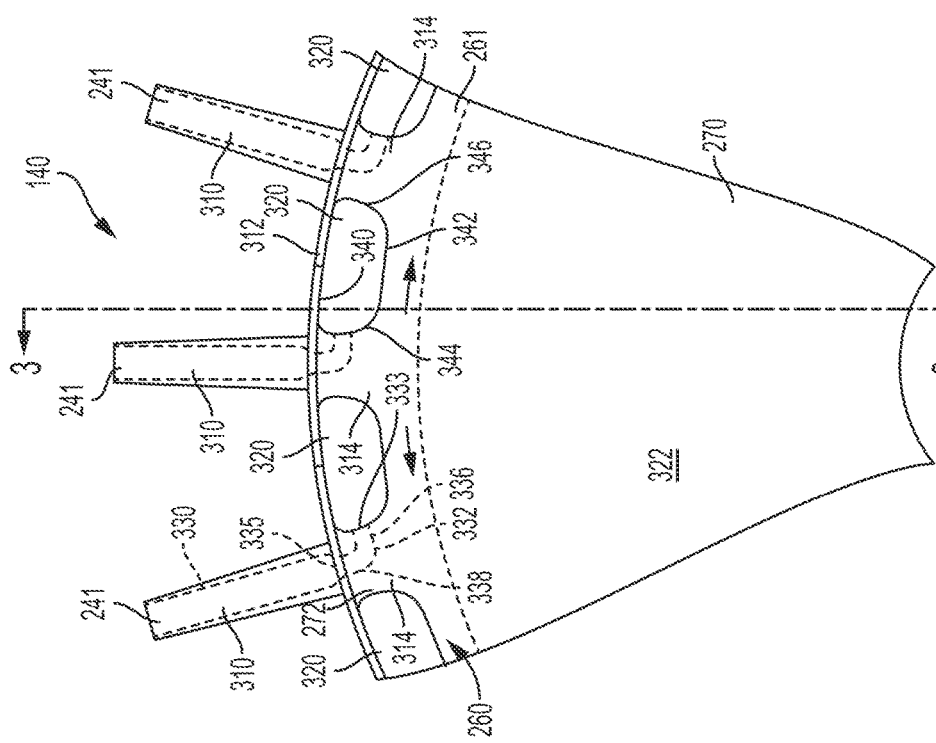
FIG. 2 is an axial downstream view of a partial segment of an example of a blisk including a disk and blade sections fully integrated into a single unit.

FIG. 2 illustrates a circumferential segment of the blisk 140 included within the engine 100 or any other suitable turbomachinery. FIG. 3 depicts a sectional view of the blisk 140 taken along lines 3-3 in FIG. 2. The blisk 140 may include one or more of the following: a plurality of blades 241 forming a blade annular element 260 and a rotor disk 270, which is in a coaxial relationship with the blade annular element 260. The blade annular element 260 may include a ring element 261 radially inward from the blades. In one example, the blade annular element 260 and the disk 270 are an integrated unit. The blade annular element 260 is shown including an outer surface 272 that may be a continuous, circumferential surface. The blades 241 may be spaced circumferentially around the blade annular assembly 260 and the disk 270 and extend radially outward from the longitudinal axis CL of the engine 100. The number of blades 241 may depend on the application of the blisk 140, for example, whether the blisk 140 is a high pressure, intermediate pressure, or low pressure stage, and what type of engine the blisk 140 belongs to.

The blades 241 may include an airfoil 310 extending radially outward from a platform 312 relative to the longitudinal axis CL, and a shank portion 314 extending below the platform. The shank portion 314 may radially extend between the platform 312 and the disk 270. A cooling cavity 320 is defined in a first face 322 of the blisk 140 between the shank portions 314 of blades 241 that are disposed adjacent to one another. The first face 322 may be referred to as the upstream or high pressure side of the blisk 140 and may also be used to reference the upstream side of the disk. A second face 324 obverse to the first face 322 may be referred to as the downstream or low pressure side of the blisk 140 and may also be used to reference the downstream side of the disk. To this end, the arrow U pointing away from the first face 322 is pointed in an upstream direction, and the arrow D pointing away from the second face 324 is pointed in a downstream direction. As shown, a plurality of cavities 320 is disposed in an annular pattern along the blisk 140. As will be described, the cooling cavities 320 are configured to receive cooling air flow from the compressor section for cooling of the shank portion, the platform, and the airfoil.

The airfoil 310 may include an internal cooling flow passage 330 (shown in dashed lines) defined therein. As will be described, the internal cooling flow passages 330 may include internal spar cavities or plenum, impingement inlet ports, spar surface cooling passageways, and/or discharge ports. A cooling feed channel 332 (also shown in dashed lines) may be defined within the shank portion 314 or disk 270. For example, the cooling feed channel 332 may extend, and in fluid communication with, to interconnect the cooling cavity 320 with the internal cooling flow passage 330. Here, the cooling feed channel 332 may include an upstream, inlet end 333 terminating at the outlet of the cooling cavity 320 and a downstream, outlet end 335 terminating at the inlet of the internal cooling flow passage 330. In alternative examples, the cooling cavity 320 may not be provided, and the cooling feed channel 332 may extend, and in fluid communication with, to interconnect the upstream side of the disk with the internal cooling flow passage 330. Here in the alternative, the upstream end 333 of the cooling feed channel 332 may terminate at the upstream side of disk, with the downstream end 335 terminating at the inlet of the internal cooling flow passage 330. In one example, the cooling feed channel 332 includes a circumferential portion 336 extending within the shank portion 314 from the upstream end 333, a radial portion 338 extending to the downstream end 335, and a radial transition 339 interconnecting the circumferential portion 336 and the radial portion 338.

The airfoil 310 may include an internal airfoil plenum defined therein forming an aspect of the internal cooling flow passage 330. A series of discharge or outlet ports may be defined by the airfoil wall to allow cooling air to leave the internal airfoil plenum for film cooling of the airfoil outer surface. The airfoil 310 may include a single wall spar configuration, having a spar with external standoffs and/or protrusions formed in the outer surface of the spar, and a cover panel attached to the spar such that the spacings between the standoffs and/or protrusions define an aspect of the internal cooling flow passage 330. Cooling air provided in the spacings provide cooling of the spar and the cover panel and a series of discharge or outlet ports may be defined by the cover panel to allow cooling air to leave the spacings for film cooling of the airfoil outer surface.

As will be described, in one example, the airfoil 310 may have a dual wall configuration with a spar including an internal spar plenum forming an aspect of the internal cooling flow passage 330. Shell or cover panel(s) is metallurgically bonded to standoffs defined in the outer surface of the spar. The standoffs may be elongated structures to form grooves or channels and/or pedestals or pins that are arranged together to define other aspects of the internal cooling flow passage 330. Discharge or outlet ports are provided in the panel for film cooling when the cooling air exits the grooves. Impingement inlet cooling ports may be formed within the grooves spaces in which the cooling air leaves the internal spar plenum and enters the grooves after impingement against underneath side of the panel. The grooves or channels forming an aspect of the internal cooling flow passages may be, for example, a serpentine, or 's', shape, with a series of radial passages, joined by bends, directing the internal blade cooling flow alternately radially inwardly and radially outwardly.

Figure 4:
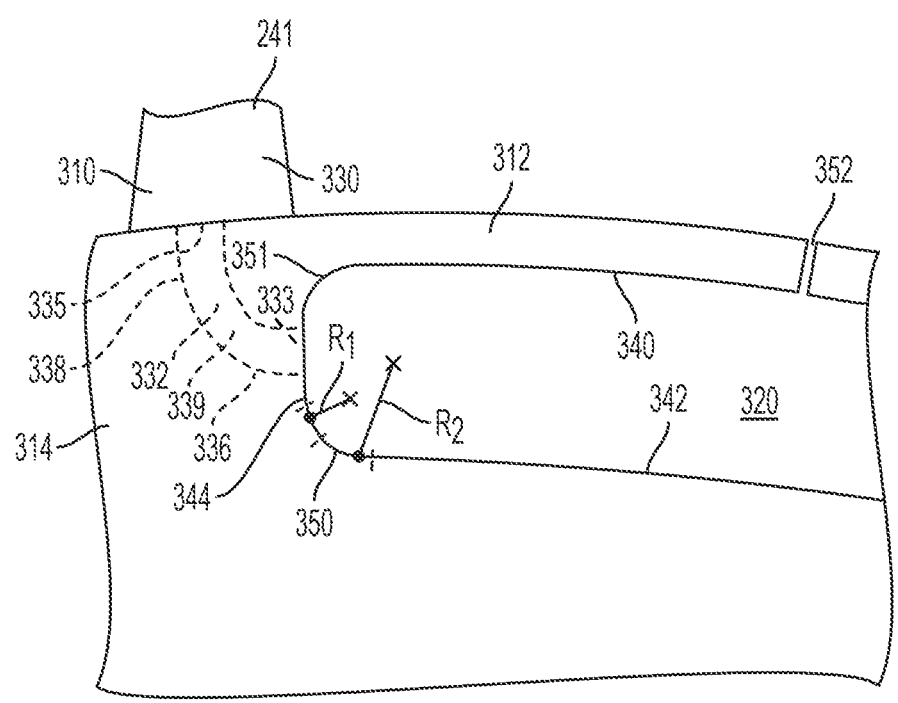
FIG. 4 is a partial detailed view of cooling cavity of the blisk of FIG. 1.

FIG. 4 depicts a detail of the cooling cavity 320. The cooling cavity 320 and the cooling feed channel 332 may be further arranged to reduce potential stress risers within the blisk. For example, a circumferentially extending outer wall 340 defining the cooling cavity 320 is shown to be formed by the radially inner surface of the platform 312, and a circumferentially extending inner wall 342 defining the cooling cavity 320 is shown radially offset from the outer wall 340, and may further form coaxial relationship. A pair of radially extending lateral walls 344, 346 defining the cooling cavity 320 may be formed by the outer surfaces of adjacent shank portions 314, which interconnect with the outer wall 340 and the inner wall 342 together to form the cooling cavity 320. Each of the lateral walls 344, 346 may extend parallel to a plane P extending through the longitudinal centerline CL. The ring segment 261 is shown radially inward from the cooling cavities 320 to define the blade annular assembly 260.

The intersection of the lateral walls 344, 346 and the inner wall 342 may form a radial transition or corner 350. The radial corner 350 may be defined having a first radius R1 extending from the lateral wall 344, for example, and a second radius R2 extending between the first radius R1 and the inner wall 342. The first radius R1 is sized for the suitable radial stress factors (Kr). The second radius R2 is sized for the suitable hoop stress factor (Kt). The first radius R1 may be less than the second radius R2. The intersection of the lateral walls 344, 346 and the outer wall 340 may form a radial transition or corner 351. Placement of the upstream end 333 of the cooling feed channel 332 may be disposed in a portion of the lateral wall 344 above or radially outside the beginning of the first radius R1 of the radial corner 350 and below or radially inside of the beginning of the radial corner 351.

The platforms 312 in FIG. 4 are also shown as discontinuous or having a slot 352 formed in an intermediate region between adjacent blades 241. The platforms 312 with slots 352 may allow for thermal expansion and contraction to occur in order to avoid thermal stresses that lead to potential cracking in the platforms. The dimensions of the platforms 312 in the circumferential direction may be sufficient that adjacent platform edges abut one another. In some examples, the platform edges in the abutment relationship may be joined permanently such as by welding or brazing.

FIG. 3 depicts the relative arrangement of the blisk 140 and adjacent upstream and downstream vane structures 400, 402, such as in a turbine section. Extending longitudinally upstream from the platform 312 beyond the shank portion 314 and the airfoil is a seal support 410 and a seal element 412. The seal support 410 may include a radial inward extension 413 and a longitudinal extension 415 extending upstream from the radial inward extension 413. The radial inward extension 413 may define an upstream faceplate of the shank portion 314 and further shielding the shank portion 314 from the hot gas path. The radial inward extension may form an annular shape, which may be a continuous annulus without any breaks or a discontinuous annulus with one or more breaks. The longitudinal extension 415 is shown as radially inward offset from the general position of the platform. The longitudinal extension 415 of the seal support 410 may form a circumferential rim, which may be a continuous rim without any breaks or a discontinuous rim with one or more breaks. In one example, the platforms 312 together with the seal support 410 may form a complete annulus shielding the disk from the temperature of the main gas path and directing the hot gas downstream for exhaust.

The seal element 412 may be in the form of a knife edge seal or other sealing mechanism. In one example, a first radially extending knife edge seal 420 and a second radially extending knife edge seal 422 extends from the radially outer surface of the longitudinal extension 415 of the seal support 410. The first knife edge seal 420 may be parallel to the second knife edge seal 422 but may be angled relative to the axis of rotation to control airflow. In one example, the first knife edge seal 420 may extend radially longer than the second knife edge seal 422. The knife edge seals 420, 422 are shown engaging with a vane seal assembly 430 of the upstream vane structure 400. In one example, the vane seal assembly 430 is an annular honeycomb structure into which the knife edge seals 420, 422. The annular honeycomb structure may provide an indirect air seal path as well as an abradable interface surface within which the knife edge seals 420, 422 sealable engage. In one example, the sealed arrangement provided between the seal element 412 and the vane seal assembly 430 may further inhibit leakage of the hot gas from mixing with the cooling air or the loss of cooling air to the hot gas path, making the disk and internal blades susceptible undesirably to hotter temperatures. Accordingly, the sealed arrangement is operable to allow for the effective passage of cooling air across the face of the disk and internal to the blade for convection cooling, thereby reducing its operating temperature.

Extending longitudinally downstream from the platform 312 beyond the shank portion 314 and the airfoil is a downstream rim 435 in the form of circumferential rim, which may be a continuous rim without any breaks or a discontinuous rim with one or more breaks. The downstream rim 435 may form a complete annulus shielding the disk from the temperature of the main gas path and directing the hot gas downstream for exhaust. The downstream vane structure 402 may include an upstream lip 438 overlapping the inner surface of the downstream rim. Seal elements, such as the honeycomb seal and knife edge seal arrangement, may be included for sealing this region.

The cooling cavity 320 is shown extending from the first face 322 through the second face 324 of the blisk 140. The upstream end 333 of the cooling feed channel 332 may be located along any portion of the lateral wall 344. FIG. 3 shows the location of the upstream end 333 being located closer to the first face 322 than the second face 324. Alternatively, more than one upstream end 333 and cooling feed channels may be included to provide more than one inlet into the internal cooling flow passage 330. The cross-sectional shape of the upstream end 333 of the cooling feed channel 332 may be round or elliptical or otherwise shaped to reduce flow losses.

Figure 5:
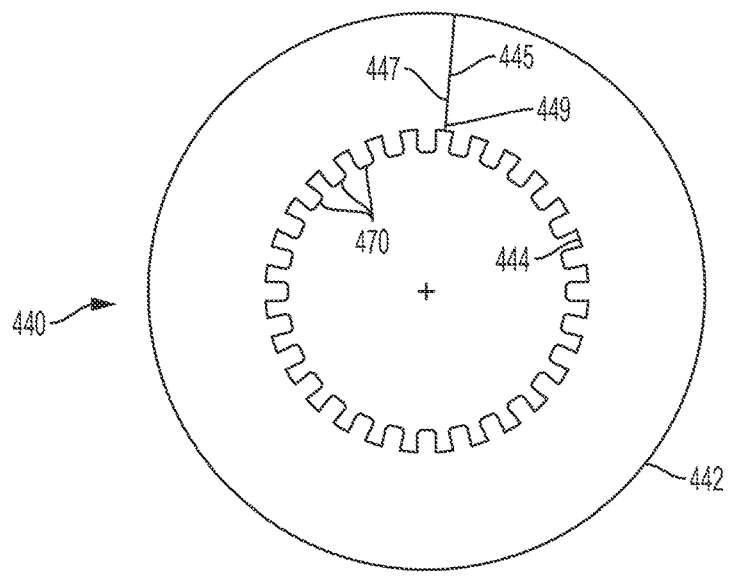
FIG. 5 depicts a coverplate provided with the blisk in FIGS. 2-3.

In FIG. 3, a coverplate 440 is securely coupled along the second face 324 or downstream side of the blisk 140. As shown in FIG. 5, the coverplate 440 may be configured as an annular structure, including a circumferential arcuate segment radially extending between an outer edge 442 and an inner edge 444. The distance between the outer edge 442 and the inner edge 444 is sized to be greater than the distance between the outer wall 340 and the inner wall 342 of the cooling cavities 320. In this manner, the coverplate 440 covers or overlaps the downstream end of the cooling cavities 320 to physically block the cooling air from exiting the cooling cavities 320 and instead direct the cooling air to the upstream end 333 of the cooling feed channel 332. The coverplate 440 may be a single annular structure. In one example, the coverplate 440 may include a slot 445 formed in the single annular structure. The slot 445 will allow the slot defining edges 447, 449 of the coverplate 440 that define the slot 445 to overlap one another during installation. The overlapping configuration of the coverplate 440 makes the cross-sectional area of the coverplate smaller for insertion into a circumferential groove defined by a radial inward flange 450, as will be described. In another example, the coverplate 440 may comprise of a plurality of plate segments provided to extend around the entire circumference of the stage, between the circumferential groove formed in the platforms and the circumferential groove formed in the disk, as will be described. The plate segments may extend through any suitable circumferential extent. For example, each plate segment may circumferentially extend to correspond to 1, 2, 3, 4, 5, 6, 7, 8, 9, 10, or more the number of blades. Adjacent edges of the plate segments may be welded or brazed.

Figure 6:
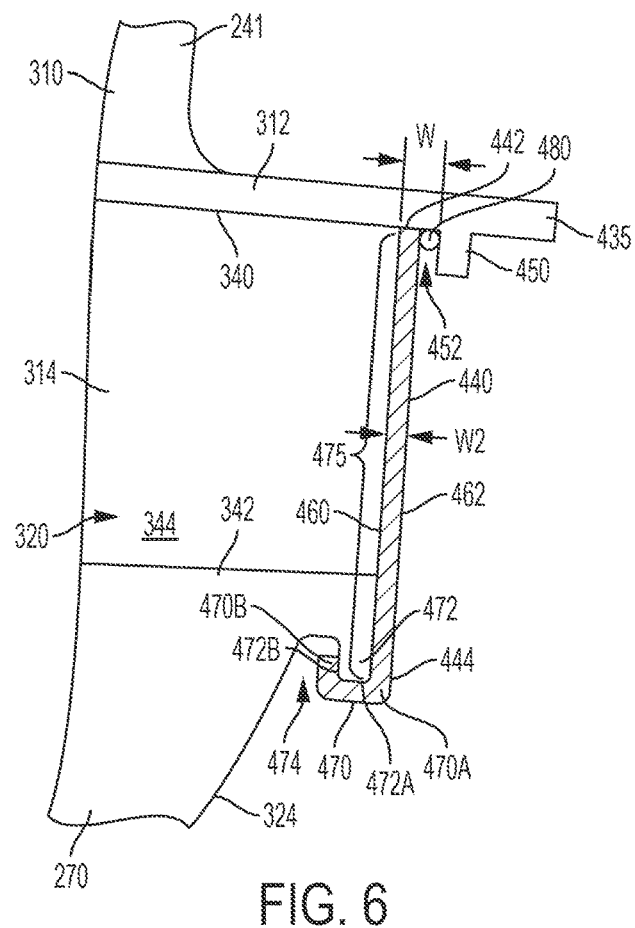
FIG. 6 is a partial detailed view of the mounting of the coverplate to the blisk.

With additional reference to FIG. 6, the radial inward flange 450 is extended from the inner surface of the platforms 312 and longitudinally offset downstream from the second face 324 to define a first circumferential groove 452 having a longitudinal width W. The longitudinal width W2 of the outer edge of the coverplate 440 is measured between upstream and downstream facing surfaces 460, 462 of the coverplate 440. The outer edge 442 of the coverplate 440 is sized to be received within the circumferential groove 452. In one example, the longitudinal width W is sized at least twice the longitudinal width W2 of the radial inward flange to accommodate the example of the overlapping configuration of the coverplate 440 during installation. A plurality of radially inner tabs 470 extends radially inward from the inner edge 444. The inner tabs 470 are circumferentially spaced from another in an annular pattern and each tab 470 is associated with one of the blade.

A radial inward lip 472 is defined by the body of the disk and longitudinally offset downstream from the second face to define a second circumferential groove 474. The radial inward lip 472 is disposed upstream from the location of the radial inward flange 450 and closer to the longitudinal axis than the radial flange. In one example, the engagement portion 475 of the second face or downstream side of the shank portions and/or disk defines a planar surface to which the upstream facing surface 460 of the coverplate 440, which is shown to be planar, engages to minimize potential leakage points. The distance between the outer edge 442 and the inner edge 444 is sized to cover the engagement portion 475 such that the inner tabs 470 may be formed around the radial inward lip 472. For example, the inner tabs 470 may have an initial non-bent configuration, as shown in FIG. 5, and may be bent or folded into a bent configuration, as shown in FIG. 6, around and/or along the radial inward lip 472, such as by a machine press, such that a body portion 470A of the inner tabs 470 is engageable with a radially inward facing surface 472A of the radial inward lip 472. In another example, the inner tabs 470 in the bent configuration may by bent or folded around the radial inward lip 472, such as by a machine press, such that a tip portion 470B of the tabs is engageable with an axially facing surface 472B of the radial inward lip 472 and inserted within the circumferential groove 474. The body and tip portions 470A, 470B may be further fixed by welding or brazing. The engagements between the portions 470A, 470B may provide further structural retainment of the coverplate to the disk and prevent or limit relative axial movement during rotational operation as well axis axial forces created by the gas pressures.

A support locking element 480 may be disposed within the circumferential groove 452 and in engagement with the downstream facing surface 462 of the coverplate 440 and the axially facing surface of the radial inward flange 450. In one example, the support locking element 480 is an elongate member or wire made of a metal or composite. The cross-sectional size of the support locking element 480 is sized to fill the difference between widths of the longitudinal widths W and W2. The support locking element 480 may provide pressure in the upstream direction along the downstream facing surface 462 of the coverplate 440 to maintain engagement with the engagement portion 475 of the disk and to prevent or limit relative axial movement between the coverplate and the disk.

Figure 7:
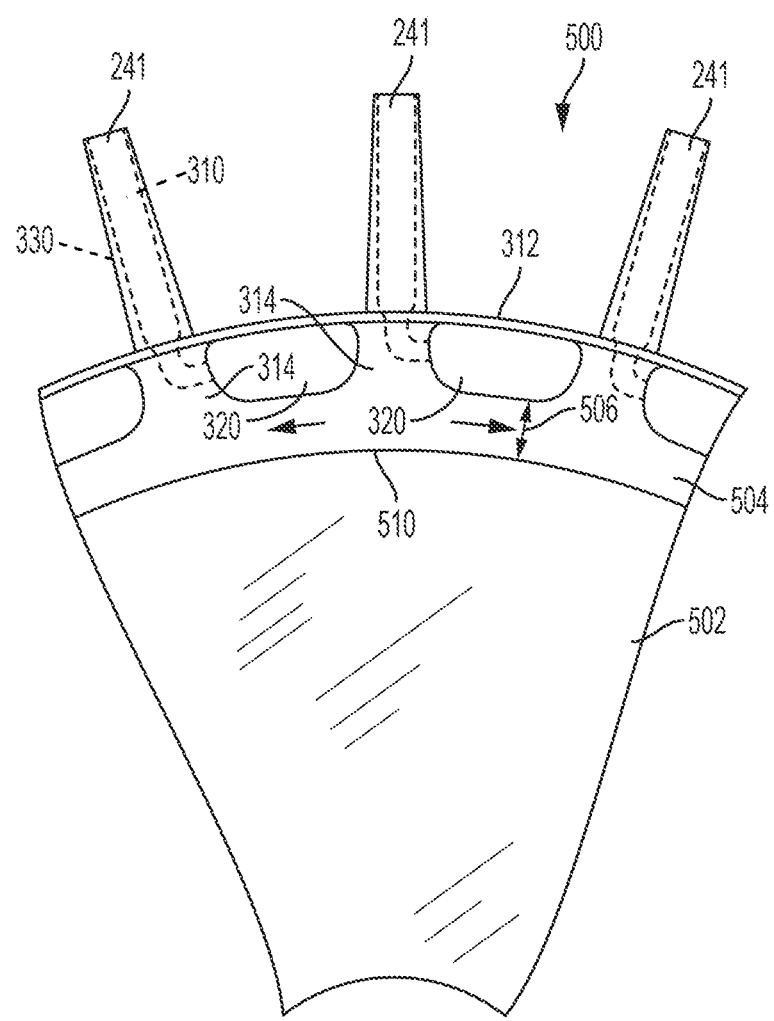
FIG. 7 is an axial downstream view of a partial segment of an example of a blisk, including a disk section bonded to a blade section.

In one example, the blisk may be formed integrally into a single structure, such as the blisk 140 shown in FIGS. 2-3. In another example, the blisk may be formed by two components, such as the blisk 500 including the disk 502 metallurgically bonded to an annular blade segment 504, as shown in FIG. 7. In either example, the blisk 140, the disk 502 and/or the annular blade segment 504, may be formed integrally, for example, by an investment casting process, or from machining from solid, or are formed separately and then permanently joined together, for example by brazing, diffusion bonding, inertia or friction welding. In this way, the blades are attached to the disk, in particular so as to resist detaching from the disk in a radial direction as a result of centripetal loading during rotation.

In one example, the blades 241 and the disk 270 may be casted or machined together into a single unit. The blades 241 may include the airfoil 310 upstanding from the platform 312, the shank portion 314 extending below the platform 312, the radial inward flange 450, the radial inward lip 472 with corresponding grooves 452, 474, the cooling cavities 320, the seal support 410, and the seal element 412.

In one example, the blades 241 may be casted or machined with the airfoil 310 upstanding from the platform 312 and the shank portion 314 extending below the platform 312. The radial inward flange 450 and the radial inward lip 472 with corresponding grooves 452, 474, the cooling cavities 320, the seal support 410 and the seal element 412 may also be casted or machined along with the platform 312. These features may be formed together to define the annular blade segment 504 that includes a ring segment 506 which may be a constant radial depth along the circumferential length at some distance below the cooling cavities 320, as shown in FIG. 7. The inner surface of the ring segment 506 may be bonded by brazing, diffusion bonding, inertia or friction welding to an outer surface of the disk 502 to define a bond line 510. In this matter, the disk may be formed from a different material and/or processes, such as by forging, having more suitable properties than the annular blade segment 504. To this end, the blades may be formed separately from the disc, preferably by casting, although other methods are not excluded.

Figure 8:
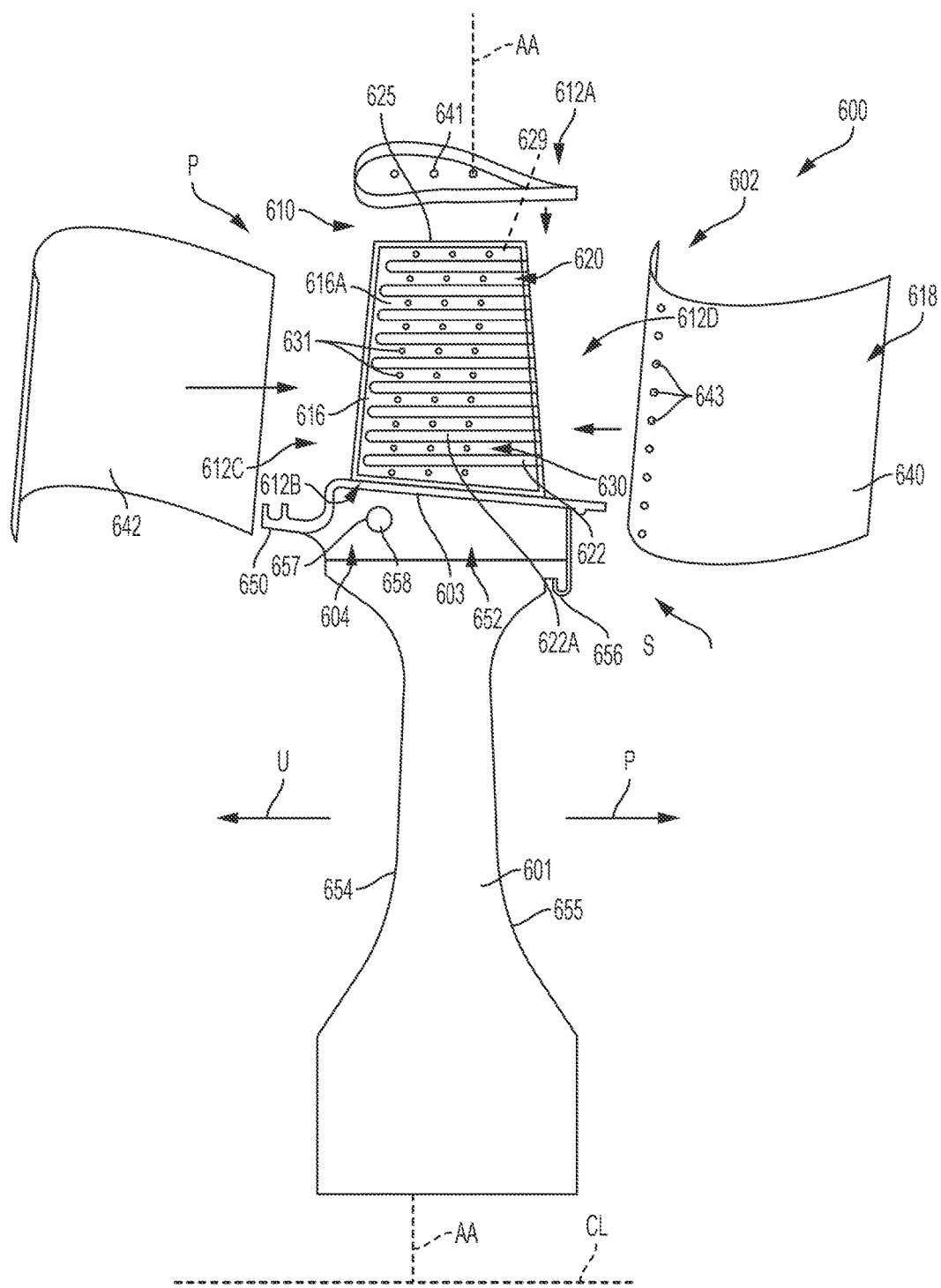
FIG. 8 is a side view of an example of a blisk including a disk and spar sections fully integrated into a single unit, and cover panels separated from the spar.
Figure 9:
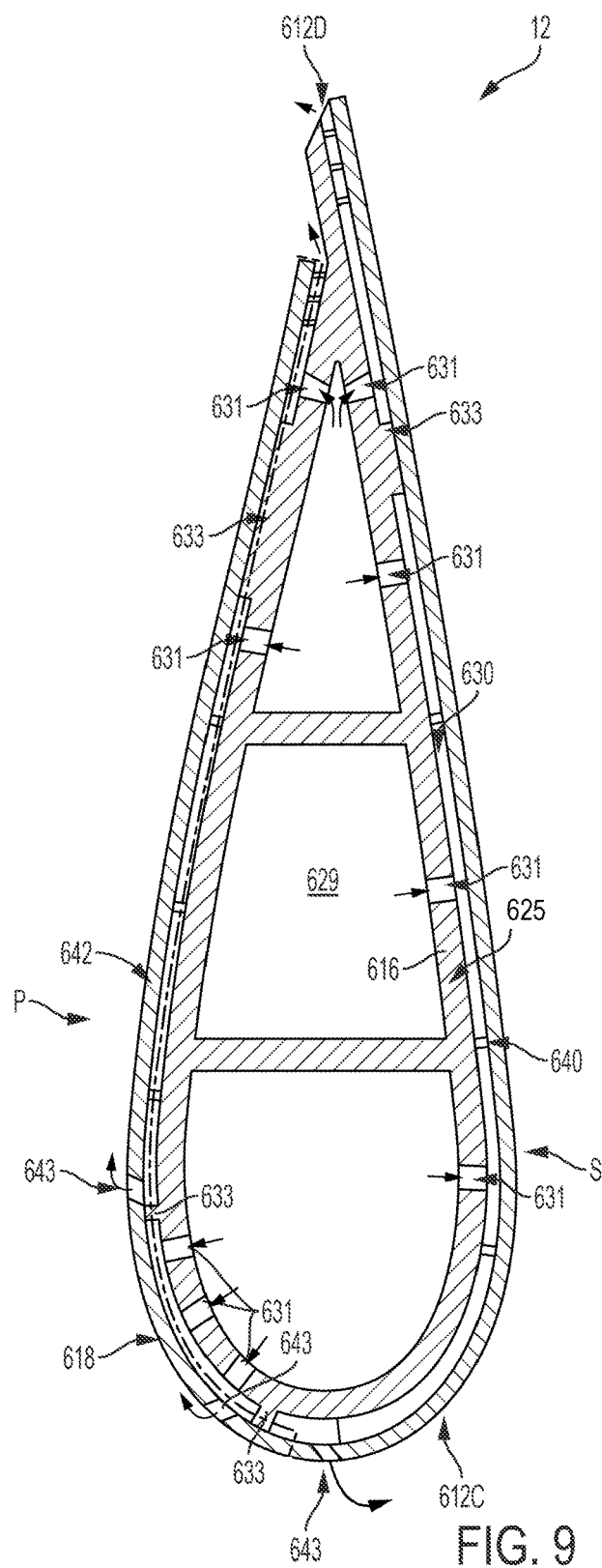
FIG. 9 is a cross-sectional view of an example dual wall blade configuration for a blisk.

FIG. 8 illustrates an example of the blisk having one or more of the features of the blisk 140, which will be now referred to as blisk 600, having the disk 601 and one or more aspects of the blade 602, shown as a cooled dual wall blade, formed integrally as a single unit. For example, a spar 616, the platform 603, and the shank portion 604 may be integrally formed with the disk 601 as a unit. With additional reference to FIG. 9, the spar 616 of the airfoil 610 includes an internal spar plenum 629 forming an aspect of the internal cooling flow passage, referred now as 630. Three chambers separated by cross members are shown defining the internal spar plenum 629 for distribution of cooling air to different sections of the airfoil, although less or more chambers may be defined. The spar 616 is disposed along an airfoil axis AA and an external cover panel 618 coupled to the spar 616, such as metallurgically bonded to the spar 616 or spar features as described below. Airfoil axis AA extends radially perpendicular to the longitudinal axis CL of the engine. The spar 616 may be formed to include a plurality of passages or grooves 620 to define a plurality of cooling flow passages 630 disposed between the spar 616 and the cover panel 618.

The grooves 620 are spaced along the spar 616 with standoffs 622 separating the grooves 620. The standoffs 622 protrude outwardly relative to the outer surface 616A of the spar 616 to define an aspect of the grooves 620. FIG. 8 shows an example pattern of grooves 620 in an elongation row configuration extending between a leading edge 612C and a trailing edge 612D and disposed radially spaced from another relative to the longitudinal axis CL and along the airfoil axis AA. The grooves 620 may have other configurations such as portions running in the direction of a tip 612A and/or a base 612B. The standoffs 622 are shown having elongated shape to define longitudinal channels. The standoffs 622 may have other configurations than illustrated in the figures. For example, to achieve the desirable cooling, the pattern of standoffs 622 may comprise a plurality of pedestals, elongate columns, or pins or combination of variously sized elongated members and/or pedestals, columns, or pins. The pedestals, columns or pins may have various cross-sectional shapes, including rectangular, diamond, circular or semi-circular, as well as other shapes.

The cover panel 618 is coupled to an outer surface 622A of the standoffs 622 with respect to the spar 616 and spaced from the spar outer surfaces 616A lining the grooves 620, thereby forming the cooling flow passages 630. A flow of cooling air passing through one cooling flow passages may be separated from a flow of cooling air passing through an adjacent cooling flow passages by the standoffs 622. The cooling flow passages 630 may be sized to define microchannels or passages. For example, a width of the grooves 620 is defined between adjacent first and second standoffs 622, and may be, for example, about 0.02 inches, 0.05 inches, or any size therebetween. Similarly, a height of the grooves 620 or depth of the cooling surface passageways is defined between the spar 616 and the cover panel 618, and may be, for example, about 0.015 inches, 0.035 inches, or any size therebetween. In one example, the plurality of grooves 620 may include a plurality of body section grooves and/or a plurality of tail section grooves separated by an internal standoff wall. As may be appreciated by one of ordinary skill in the art, the grooves 620 may be formed in the suction side S of the spar 616, as shown in FIG. 8, the pressure side P of the spar 616, or a combination of both.

The spar 616 includes a spar wall 625, which may define sections of the spar, such as a body section and a tail section of the spar 616. The spar wall 625 is disposed to define the internal spar plenum 629 along the airfoil axis AA within the hollow spar. The internal spar plenum 629 is adapted to receive a flow of cooling air for delivery to the plurality of grooves 620 via one or more inlet ports 631 defined by the spar wall 625. Radial separator walls 633 may be formed along the spar 616 to segment the cooling surface passageways from the body section, tail section and the leading edge.

The cover panel 618 may include a single sheet that is formed and shaped of the final shape of the airfoil. In another example, as shown, the cover panel 618 may include a suction-side panel 640 and a pressure-side panel 642. Optionally, a tip plate 641 may be disposed over the tip section of the spar and coupled metallurgically to the suction side and pressure side panels. The suction-side panel 640 may be coupled to the outer surface 622A of the suction-side standoffs 622 of the suction side S of the spar 616 to at least partially cover the suction-side grooves defining the cooling surface passageways. Similarly, the pressure-side panel 642 may be coupled to the outer surface 622A of the pressure-side standoffs 622 at the pressure side P of the spar 616. The single sheet cover panel or the panels 640, 642 may be a thin walled member, having a wall thickness in the range, such as, for example, about 0.015 inches to 0.025 inches. The cover panel 618 may include one or more discharge ports 643 formed therein at the leading edge, the trailing edge, an intermediate section between the leading and trailing edges, the tip edge, or any combination thereof.

The seal element 650 is shown extending from the platform 603, as described above. The cooling cavity 652 is shown extended from the first face 654 of the blisk between the shank portions of blades that are disposed adjacent to one another, as described above. The coverplate 656 is shown securely coupled, as described above, along the second face 655 or downstream side of the blisk. The upstream end 657 of the cooling feed channel 658 is shown extending from the cooling cavity 652. The downstream end (not shown) of the cooling feed channel 658 may terminate at the base inlet of the internal spar plenum 629.

Figure 10:
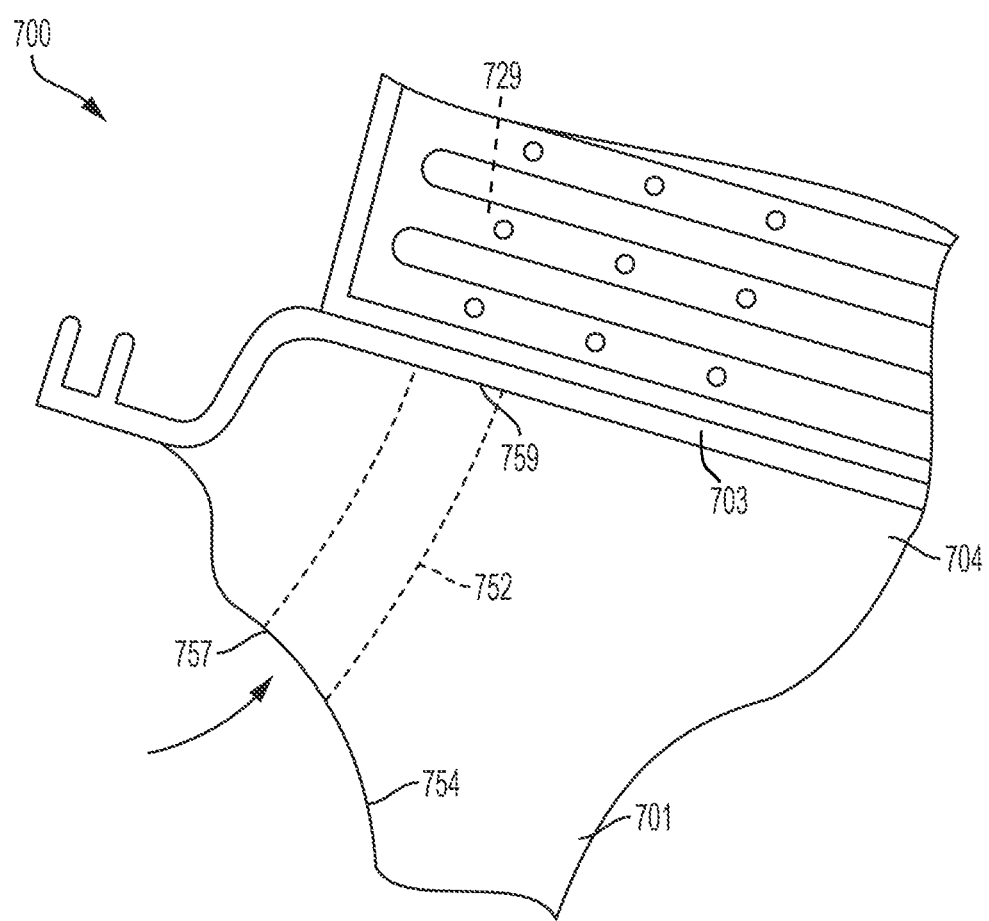
FIG. 10 depicts an example of a blisk having an alternative cooling feed channel configuration.

FIG. 10 illustrates an example of the blisk 600 without the cooling cavities 652, and will now be referred to as blisk 700. In this example, the cooling feed channel, now referred to as 752, is shown extending between, and in fluid communication with, the first upstream face 754 of the blisk 700 and the internal spar plenum 729. Here, the upstream end 757 of the cooling feed channel 752 is located at the first upstream face 754 and the downstream end 759 of the cooling feed channel 752 may terminate at the base inlet of the internal spar plenum 729. The upstream end 757 may be located radially below the platform 703 along the shank portion 704 or disk 701 of the blisk. Depending on the profile of the blade, the cooling feed channel 752 may be shaped to minimize pressure losses. To this end, the cooling feed channel 752 may include a substantial radial portion with minimal or without transition.

In one example, the disclosed blisks and blisk components described herein may be formed of a heat resistant superalloy composition, a ceramic material, such as a ceramic-matrix composite (CMC) material, or other materials used for components. There are various types of superalloy compositions, such as but not limited to nickel based or cobalt based compositions, and the manufacturers of such compositions are generally known to those skilled in the art. Most superalloy compositions of interest are complicated mixtures of nickel, chromium, aluminum and other select elements. The disclosed blisks may be of a unitary cast configuration, and/or an assembly of cast components, and/or an assembly of cast and wrought components. The disclosed blisks may have an equiax, directionally solidified or a single crystal alloy structure. In one example, the blisk may be casted of single crystal single structure unit. Further, in alternate examples of the present invention the products may be formed of a metallic material, or an intermetallic material or a ceramic material. As mentioned above, the materials used for these blisk components need not be the same. For example, the annular blade segment may be cast from a nickel alloy, such as, for example, MAR-M-002 or MAR-M-234, while a nickel alloy powder known as UDIMET 720 may be used to form the disk.

The cooling cavities, channels, passages, outlet and inlet ports may be formed from the use of ceramic inserts used during casting. In casting the blades, the internal cooling passages may be created by the use of ceramic cores (not shown) which may be subsequently leached out leaving the internal passages and cavities. In one example, the airfoil wall and the spar of the airfoil of the blade may be integrally formed as a unitary component through a casting or additive manufacturing, such as a three-dimensional (3-D) printing process, for example. In another example, the spar may be formed through a casting process to form standoffs in the desired pattern of pedestals, elongate columns, and/or pins that line the boundaries of grooves or channels. In another example, the spar may be machined via mechanical milling or pulse electrochemical machining (ECM) to form the standoffs in the desired pattern of pedestals, elongate columns, and/or pins and the grooves or channels. The spar after processing may be configured to receive a cover panel. In another example, a spar and a cover panel that may be placed over the spar may be integrally formed with one another, with standoffs walls and the grooves or channels formed between the spar and the cover panel.

In one example, a method of manufacturing the disclosed blisks 140, 500, 600, or 700 including one or more of the following steps or any combination thereof with an investment casting process. The casted cooled blisk unit may include cooled airfoils of blisk blades cast integrally with the disk. The airfoil cooling circuit formed by the internal cooling flow passages, including the internal spar plenum and/or the grooves, may be formed by placing ceramic cores into a rotor wax pattern before being shelled and casted. The internal spar plenum aspect of the internal cooling flow passages formed by a ceramic core may held in position by ceramic core printouts or pins at the cooling air entry ports and outlet ports, as needed, in the trailing edge and tips. Small local protrusions may be formed on the ceramic core to keep the core from shifting during the pour and for controlling wall thickness of the airfoil.

For example, ceramic structures including one or more sacrificial ceramic cores having any of the features described herein is provided. The ceramic cores may be shaped to correspond with the desired pattern of internal cooling flow passages. The ceramic structure having the one or more sacrificial ceramic cores may be inserted into a casting mold. Particularly, the ceramic structure defined at least in part by the one or more sacrificial ceramic core may be positioned within two joined halves of a metal casting mold. The casting mold defines an injection volume that corresponds to the desired shape of the airfoil of the blade of the blisk. Other ceramic structures may be used to define the cooling feed channels within the shank portions and/or disks and coupled to the ceramic core for defining a non-obstructed cooling air passage into the airfoil.

Melted wax may be vacuum injected into a wax mold around the ceramic structure. After the wax hardens, the wax mold halves are separated and removed to reveal the ceramic structure encased inside a wax pattern that corresponds to the shape of the airfoil of the blade of the blisk. The wax pattern's outer surface may be then coated with a ceramic material, such as, for example, by a dipping process, to form the ceramic shell around the ceramic structure and wax pattern unit. A component material in the form of a molten metal alloy may be introduced into the casting mold. Particularly, upon curing of the ceramic shell and removal of the wax such as by an oven, a completed ceramic casting mold may be available to receive molten alloy in the investment casting process. Molten metal alloy material may be then cast into the ceramic casing mold. The ceramic structure including the one or more sacrificial ceramic cores may be removed after the component material has solidified. Particularly, after the molten metal alloy has solidified, the ceramic structure, including the sacrificial ceramic cores may be removed by mechanical and/or chemical means to reveal the component as a final cast alloy.

The final cast alloy may be close to final form or finished shape, either as the full blisk having the spar ready for bonding to the cover panel or the annular blade segment for attachment to the disk to form the full blisk having the spar that is ready for bonding to the cover panel. The final cast alloy may then be machined, such as by drilling, laser cutting, wire EDM (electric discharge machining), grinding and/or polishing. For example, the cooling cavities, if employed, may be formed by the removal of the corresponding sections. The final shape of the platform and/or the seal support may be formed. The seal element, such as the knife edge seals, may be machined into the upstream section of the platforms. The slots may be machined into the platforms, as shown, to define a discontinuous platform. One or more outlet ports may be machined with, for example, by drilling or laser cutting, in the final cast alloy component such that the machined ports in the airfoil are in fluid communication with the internal cooling flow passages.

Alternatively, the disclosed blisks or substantial aspects of the blisks may be manufactured using conventional techniques generally referred to as additive manufacturing or additive fabrication. Known additive manufacturing/fabrication processes include techniques such as, for example, 3-D printing, which is a process where material is deposited successively in layers under the control of a programmable computer to form the 3-D structure unit. Additive fabrication equipment, such as a 3-D printer, is commanded by the computer to deposit the successive layers in accordance with a computer-readable 3-D model (for example, an AMF or STL digital file). The 3-D software model configured to be converted into a plurality of substantially two-dimensional (2-D) slices. The 2-D slices define a cross-sectional layer of the blisk in order to manufacture, or fabricate, one of the disclosed blisk/blisk component configurations described above. In one example, the 3-D printing process may be utilized to manufacture the blisk, including the spar extending away from the disk, with the cover panel integrated with the spar. In one example, the 3-D printing process may be utilized to manufacture the blisk, including the spar extending away from the disk that will be subsequently coupled to the cover panel. In one example, the disk may be formed by casting, forging, or 3-D printing, and the 3-D printing process may be utilized to manufacture the spar, the platform, and the shank portion, and the other disclosed features, directly on the previously formed disk to form one of the disclosed blisks.

In one example, a 3-D model used to represent one of the disclosed blisk/blisk component configurations described above may be on a computer-readable storage medium such as, for example, magnetic storage including floppy disk, hard disk, or magnetic tape; semiconductor storage such as solid state disk (SSD) or flash memory; optical disc storage; magneto-optical disc storage; or any other type of physical memory on which information or data readable by at least one processor may be stored. The storage medium may be used in connection with commercially available 3-D printers to manufacture, or fabricate, one of the blisk/blisk component configurations described above. Alternatively, the 3-D model may be transmitted electronically to the 3-D printer in a streaming fashion without being permanently stored at the location of the 3-D printer. In either case, the 3-D model constitutes a digital representation of one of the blisk/blisk component configurations described above suitable for use in manufacturing aspects of the blisks.

The 3-D model may be generated by various means. In general, the 3-D model may be created by inputting data representing one of blisk/blisk component configurations described above to a computer or a processor such as a cloud-based software operating system. In an example, the 3-D model may be suitable for the purpose of manufacturing one of blisk/blisk component configurations described above by an additive manufacturing technique. The additive manufacturing process utilized to create one of blisk/blisk component configurations described above may include one of the materials reference above. The additive manufacturing process may form a finished product, or additional processes may be performed to create the finished product. Such additional processes may include, for example, one or more of cleaning, hardening, heat treatment, material removal, and polishing, and other machining processes disclosed herein. The additive manufacturing process may be used to form individual units (spars, spar/cover panel units, airfoil units, blade units) and/or annular segments of multiple units. These formed units may be permanently joined, for example by brazing, diffusion bonding, inertia or friction welding, to the disk.

The cover panel(s) may be metallurgically bonded to the outer surfaces of the standoffs. To prepare the as-cast bond outer surface or the additive manufactured outer surface of the standoffs for such cover panel bonding, that is, to prepare a smooth and continuous surface, material may be removed from the as-cast outer surface or additive manufactured outer surface. The material, for example about 0.001 to 0.002 inches of material, may be removed by any suitable means, for example, by high-speed milling or a similar process. The bonding process may utilize the CastBond™ process for Ni alloys, a suitable process for Ti alloys, which may include the use of Ti braze filler material such as Taconic. A shaft bore may be formed or further machined into the center of the disk of any one of the disclosed blisks. The shaft bore may be configured to receive an engine shaft component. When the blisk is formed by two components, such as the blisk 500 shown in FIG. 7, the annular blade segment 504 after being casted may be permanently joined together, for example by brazing, diffusion bonding, inertia or friction welding, to the disk 502.

Cooling air used for cooling turbine components may be supplied from any suitable source. For example, the cooling air may be bled internally from one or more of the compressors, such as, for example, an intermediate pressure compressor and/or a high pressure compressor of the compressor portion. Cooling air comes from fluid passages from the compressor portion, around the combustion portion and into the turbine portion. The platforms may form a shield to protect the disk from the temperature of the main gas path and directing the hot gas downstream for exhaust, and to prevent leakage of cooling air into the hot gas path.

As described above, one of the disclosed blisks is configured to allow cooling air to enter the internal cooling flow passages within the blades, such as the internal spar plenum and the cooling air passages defined between the spar and the cover panel. To reach these locations, the cooling is fed through the cooling feed channels in the blade shank portions or disks, which are located under the platforms. Before entering the cooling feed channels, the cooling air path may be arranged to draw the air across the first face of the disk of the blisk thereby cooling the disk portion of the blisk. Cooling air may enter the cooling cavities, if employed, from the first face of the blisk and be directed to the cooling feed channels. Alternatively, the cooling air may enter directly into the cooling feed channels. The downstream end of the cooling cavities may be blocked by the upstream facing surface of the installed coverplate, if employed. This means that substantially all of the cooling air (with industry acceptable leakage considered by one of ordinary skill in the art) entering the cooling cavities is fed into the cooling feed channels, and subsequently through the internal cooling flow passages. In one example, substantially none of the cooling air that enters the cooling cavities passes through to the downstream side of the blisk.

At least a portion of the cooling air may be directed into the internal spar plenum within the airfoil to provide cooling, for example, effusion cooling. The cooling air passing into the cooling cavities experiences a centripetal acceleration due to the rotation of the blisk. In turn, the cooling air moves through the cooling feed channels of the shank portion in the radially outward direction to the internal spar plenum. Cooling air is delivered to the grooves along the outer surface of the spar via the inlet or impingement inlet ports defined in the spar wall. Cooling air leaving the spar plenum through the ports is directed against the underneath surface of the cover panel for impingement cooling of the cover panel. Additional cooling of the spar and panel occurs as the cooling air moves through the pattern of standoffs forming the cooling flow surface passages. Cooling air may exit the cooling passages through discharge or outlet ports in the cover panel and along the outside surface of the airfoil for film cooling. The film outlet ports or slot may be configured to reduce the aerodynamic penalty and further reduce surface temperatures. Embedding the channels below the airfoil surface allows for higher cooling effectiveness. Cooling air enters the cooling channel and flows along the smooth surface.

Improvement in temperature limitations of the blisk and blades with cooling features may allow less cooling air flow from compressor to be used. Less air flow may result in such saved air being used in the combustor, therefore promoting the capture of better fuel economy for the gas turbine engine. Improvements in temperature limitations of the blisk assembly and blade section may allow the turbine gas engines to operate hotter and with additional power. The blisk assembly configurations may provide an inexpensive option and/or reduced weight for a turbine section.

In some instances, the term "disk" may be defined generally as referring to any structure extending from the inner edge of the disk to the platform. In this regard, the term "disk" may encompass the structure defined as the shank portion, which, in some examples, may be preferred when the structure is casted and difficult to distinguish the components.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

The subject-matter of the disclosure may also relate, among others, to the following aspects:

1. A blisk for a gas turbine engine, the blisk comprising a disk, a spar, a platform, and a shank portion integrally formed as a unit, the disk disposed about a longitudinal axis and having an upstream side and a downstream side, the spar extending radially outward from the platform relative to the longitudinal axis, the shank portion extending between the platform and the disk, wherein the spar includes a cooling air plenum defined therein disposed along an airfoil axis, a plurality of standoffs extending away from an outer surface of the spar, wherein the blisk further comprises a cover panel bonded to an outer surface of the standoffs, wherein the standoffs are spaced from one another such that cooling passages are defined between the cover panel and the spar, the spar comprising one or more inlet ports defined therein in communication with the cooling air plenum and the cooling passages, the cover panel having one or more discharge ports defined therein in communication with the cooling passages, wherein a cooling feed channel is defined in the disk or shank portion that is in communication with the cooling air plenum, wherein the cooling feed channel is configured to receive cooling air upstream of the disk for delivery to the cooling air plenum.

2. The blisk of aspect 1, wherein the disk, the spar, the platform, and the shank portion are a casted unit.

3. The blisk of aspect 1, wherein the spar, the platform, and the shank portion are a successively layered formed unit.

4. The blisk of any one of aspects 1-3, wherein the cooling feed channel includes an inlet formed in the upstream side of the disk or the shank portion.

5. The blisk of any one of aspects 1-3, wherein the disk includes a cooling cavity defined therein between the shank portions that are adjacent to one another, the cooling cavity extending from the upstream side in a downstream direction, wherein the cooling feed channel includes an inlet formed in a lateral wall that defines a portion of the cooling cavity.

6. The blisk of any one of aspects 1-5, wherein the cover panel comprises a single sheet.

7. The blisk of any one of aspects 1-5, wherein the cover panel comprises a suction-side panel and a pressure-side panel.

8. The blisk of any one of aspects 1-7, wherein the plurality of standoffs includes a first standoff and a second standoff, each having an elongated shape and adjacent to one another to define cooling passage channels.

9. The blisk of any one of aspects 1-8, wherein the plurality of standoffs includes pedestals or pins.

10. A method of making a blisk for a gas turbine engine, the method comprising the steps of: forming a disk, a spar, a platform, and a shank portion integrally as a unit, wherein the spar extends radially outward from the platform, the shank portion extends between the platform and the disk, wherein the spar includes a cooling air plenum defined therein, a plurality of standoffs extending away from an outer surface of the spar, the standoffs spaced away from one another such that cooling passages are defined therebetween, and one or more inlet ports defined in the spar and in communication with the cooling air plenum and the cooling passages, wherein a cooling feed channel and a cooling cavity are defined in the disk or shank portion that are in communication with the cooling air plenum; coupling a cover panel to an outer surface of the standoffs; and coupling a coverplate over the cooling cavity.

11. The method of aspect 10, wherein the disk, the spar, the platform, and the shank portion are integrally formed as a casted unit.

12. The method of aspect 10, wherein the forming a disk, a spar, a platform, and a shank portion integrally as a unit step includes forming the disk; providing a computer-readable three-dimensional model of the spar, the platform, and the shank portion, the three-dimensional model being configured to be converted into a plurality of slices that each define a cross-sectional layer of the spar, the platform, and the shank portion; and successively forming each layer of the spar, the platform, and the shank portion directly on the disk by additive manufacturing.

13. The method of aspect 10, wherein the forming step and the coupling step include forming the disk; providing a computer-readable three-dimensional model of the spar, the platform, the shank portion, and the cover panel, the three-dimensional model being configured to be converted into a plurality of slices that each define a cross-sectional layer of the spar, the platform, the shank portion, and the cover panel; and successively forming each layer of the spar, the platform, the shank portion, and the cover panel directly on the disk by additive manufacturing.

14. The method of any one of aspects 10-13, wherein the cooling feed channel is formed including an inlet defined in the upstream side of the disk or the shank portion.

15. The method of any one of aspects 10-13, further comprising forming a cooling cavity in the disk between the shank portions that are adjacent to one another, the cooling cavity extending from the upstream side in a downstream direction, wherein the cooling feed channel includes an inlet formed in a lateral wall that defines a portion of the cooling cavity.

16. The method of any one of aspects 10-15, wherein the coupling step includes bonding the cover panel comprising a single sheet to the outer surface of the standoffs.

17. The method of any one of aspects 10-15, wherein the cover panel comprises a suction side panel and a pressure side panel, wherein the coupling step includes bonding the suction side panel and the pressure side panel to the outer surface of the standoffs.

18. A gas turbine engine comprising a turbine section, the turbine section including a blisk, the blisk comprising a disk, a spar, a platform, and a shank portion integrally formed as a unit, the disk disposed about a longitudinal axis and having an upstream side and a downstream side, the spar extending radially outward from the platform relative to the longitudinal axis, the shank portion extending between the platform and the disk, wherein the spar includes a cooling air plenum defined therein disposed along an airfoil axis, a plurality of standoffs extending away from an outer surface of the spar, wherein the blisk further comprises a cover panel bonded to an outer surface of the standoffs, wherein the standoffs are spaced from one another such that cooling passages are defined between the cover panel and the spar, the spar comprising one or more inlet ports defined therein in communication with the cooling air plenum and the cooling passages, the cover panel having one or more discharge ports defined therein in communication with the cooling passages, wherein a cooling feed channel is defined in the disk or shank portion that is in communication with the cooling air plenum, wherein the cooling feed channel is configured to receive cooling air upstream of the disk for delivery to the cooling air plenum.

19. The gas turbine engine of aspect 18, wherein the disk, the spar, the platform, and the shank portion are a casted unit.

20. The gas turbine engine of aspect 18, wherein the spar, the platform, and the shank portion are a successively layered formed unit.

What is claimed is:

1. A blisk for a gas turbine engine having a longitudinal axis, the blisk comprising a disk, a spar, a platform, and a shank portion integrally formed as a unit, the disk disposed about a longitudinal axis and having an upstream side and a downstream side, the spar extending radially outward from the platform relative to the longitudinal axis, the shank portion extending between the platform and the disk, wherein the spar includes a cooling air plenum defined therein disposed along an airfoil axis radially extended from the longitudinal axis, a plurality of standoffs extending away from an outer surface of the spar, wherein the blisk further comprises a cover panel bonded to an outer surface of the standoffs, wherein the standoffs are spaced from one another such that cooling passages are defined between the cover panel and the spar, the spar comprising one or more inlet ports defined therein in communication with the cooling air plenum and the cooling passages, the cover panel having one or more discharge ports defined therein in communication with the cooling passages, wherein a cooling feed channel is defined in the disk or shank portion that is in communication with the cooling air plenum, wherein the cooling feed channel is configured to receive cooling air upstream of the disk for delivery to the cooling air plenum.

2. The blisk of claim 1, wherein the disk, the spar, the platform, and the shank portion are a casted unit.

3. The blisk of claim 1, wherein the spar, the platform, and the shank portion are a successively layered formed unit.

4. The blisk of claim 1, wherein the cooling feed channel includes an inlet formed in the upstream side of the disk or the shank portion.

5. The blisk of claim 1, wherein the disk includes a cooling cavity defined therein between the shank portions that are adjacent to one another, the cooling cavity extending from the upstream side in a downstream direction, wherein the cooling feed channel includes an inlet formed in a lateral wall that defines a portion of the cooling cavity.

6. The blisk of claim 1, wherein the cover panel comprises a single sheet.

7. The blisk of claim 1, wherein the cover panel comprises a suction-side panel and a pressure-side panel.

8. The blisk of claim 1, wherein the plurality of standoffs includes a first standoff and a second standoff, each having an elongated shape and adjacent to one another to define cooling passage channels.

9. The blisk of claim 1, wherein the plurality of standoffs includes pedestals or pins.

10. A method of making a blisk for a gas turbine engine, the method comprising the steps of:
    forming a disk, a spar, a platform, and a shank portion integrally as a unit, wherein the spar extends radially outward from the platform, the shank portion extends between the platform and the disk, wherein the spar includes a cooling air plenum defined therein, a plurality of standoffs extending away from an outer surface of the spar, the standoffs spaced away from one another such that cooling passages are defined therebetween, and one or more inlet ports defined in the spar and in communication with the cooling air plenum and the cooling passages, wherein a cooling feed channel and a cooling cavity are defined in the disk or shank portion that are in communication with the cooling air plenum;
    coupling a cover panel to an outer surface of the standoffs; and
    coupling a coverplate over the cooling cavity.

11. The method of claim 10, wherein the disk, the spar, the platform, and the shank portion are integrally formed as a casted unit.

12. The method of claim 10, wherein the forming the disk, the spar, the platform, and the shank portion integrally as a unit step includes forming the disk; providing a computer-readable three-dimensional model of the spar, the platform, and the shank portion, the three-dimensional model configured to be converted into a plurality of slices that each define a cross-sectional layer of the spar, the platform, and the shank portion; and successively forming each layer of the spar, the platform, and the shank portion directly on the disk by additive manufacturing.

13. The method of claim 10, wherein the forming step and the coupling step include forming the disk; providing a computer-readable three-dimensional model of the spar, the platform, the shank portion, and the cover panel, the three-dimensional model being configured to be converted into a plurality of slices that each define a cross-sectional layer of the spar, the platform, the shank portion, and the cover panel; and successively forming each layer of the spar, the platform, the shank portion, and the cover panel directly on the disk by additive manufacturing.

14. The method of claim 10, wherein the cooling feed channel is formed including an inlet defined in the upstream side of the disk or the shank portion.

15. The method of claim 10, further comprising forming a cooling cavity in the disk between the shank portions that are adjacent to one another, the cooling cavity extending from the upstream side in a downstream direction, wherein the cooling feed channel includes an inlet formed in a lateral wall that defines a portion of the cooling cavity.

16. The method of claim 10, wherein the coupling step includes bonding the cover panel comprising a single sheet to the outer surface of the standoffs.

17. The method of claim 10, wherein the cover panel comprises a suction side panel and a pressure side panel, wherein the coupling step includes bonding the suction side panel and the pressure side panel to the outer surface of the standoffs.

18. A gas turbine engine having a longitudinal axis, the engine comprising a turbine section, the turbine section including a blisk, the blisk comprising a disk, a spar, a platform, and a shank portion integrally formed as a unit, the disk disposed about a longitudinal axis and having an upstream side and a downstream side, the spar extending radially outward from the platform relative to the longitudinal axis, the shank portion extending between the platform and the disk, wherein the spar includes a cooling air plenum defined therein disposed along an airfoil axis radially extended from the longitudinal axis, a plurality of standoffs extending away from an outer surface of the spar, wherein the blisk further comprises a cover panel bonded to an outer surface of the standoffs, wherein the standoffs are spaced from one another such that cooling passages are defined between the cover panel and the spar, the spar comprising one or more inlet ports defined therein in communication with the cooling air plenum and the cooling passages, the cover panel having one or more discharge ports defined therein in communication with the cooling passages, wherein a cooling feed channel is defined in the disk or shank portion that is in communication with the cooling air plenum, wherein the cooling feed channel is configured to receive cooling air upstream of the disk for delivery to the cooling air plenum.

19. The gas turbine engine of claim 18, wherein the disk, the spar, the platform, and the shank portion are a casted unit.

20. The gas turbine engine of claim 18, wherein the spar, the platform, and the shank portion are a successively layered formed unit.

* * * * *